United States Patent
Cho et al.

[11] Patent Number: 5,968,415
[45] Date of Patent: *Oct. 19, 1999

[54] WATER-SOLUBLE PHOSPHOR MATERIAL FOR COLOR PICTURE TUBES AND A PROCESS FOR MANUFACTURING THE SAME

[75] Inventors: Jongho Cho, Kwachun-si; Choonglak Kim, Suwon, both of Rep. of Korea

[73] Assignee: Samsun Display Devices Co., Ltd., Kyungki-do, Rep. of Korea

[ * ] Notice: This patent is subject to a terminal disclaimer.

[21] Appl. No.: 09/078,398

[22] Filed: May 13, 1998

Related U.S. Application Data

[63] Continuation-in-part of application No. 08/744,279, Nov. 6, 1996, abandoned, which is a continuation-in-part of application No. 08/593,881, Jan. 30, 1996, abandoned.

[30] Foreign Application Priority Data

Nov. 7, 1995 [KR] Rep. of Korea ............... 95-40107

[51] Int. Cl.$^6$ ............ C09K 11/02; C09K 11/62; C09K 11/55
[52] U.S. Cl. .............. 252/301 R; 252/301.36; 428/403; 428/404
[58] Field of Search ............ 252/301.4 R, 301.36; 428/403, 404

[56] References Cited

U.S. PATENT DOCUMENTS

| | | | |
|---|---|---|---|
| 3,576,757 | 4/1971 | Brown, Jr. | 252/301.4 R |
| 4,100,454 | 7/1978 | Hase et al. | 252/301.4 R |
| 5,162,930 | 11/1992 | Sluzky et al. | 252/301.4 R |
| 5,723,070 | 3/1998 | Kim et al. | 252/301.36 |

FOREIGN PATENT DOCUMENTS

| | | |
|---|---|---|
| 53-013351 | 2/1978 | Japan . |
| 53-076183 | 7/1978 | Japan . |
| 53-076185 | 7/1978 | Japan . |
| 58-089681 | 5/1983 | Japan . |
| 61-064784 | 4/1986 | Japan . |
| 63-178194 | 7/1988 | Japan . |

OTHER PUBLICATIONS

Chemical Abstracts 89:50902. 1978 no month.

Chemical Abstracts 83:155057. 1974 no month.

Postolov, "Synthesis and Luminescence Properties of Certain Alkali–Metal Gallates", Bull. Acad. Sci. USSR, Pys. Ser. (USA), vol. 38, No. 6, Jun. 1974.

*Primary Examiner*—C. Melissa Koslow
*Attorney, Agent, or Firm*—Christie, Parker & Hale, LLP

[57] ABSTRACT

The present invention provides a water-soluble gallate phosphor material with excellent luminous characteristics and a process for manufacturing of color CRT using the same material as above. The process improves luminous efficiency and color reproduction region and increases resolution due to decrease in electron spot from the current reduction by electron beams in luminance on the same phosphor screen, by introduction of the electrophotographic dry screening process without using water.

8 Claims, 4 Drawing Sheets

WATER-SOLUBLE PHOSPHOR MATERIAL FOR COLOR PICTURE TUBES AND A PROCESS FOR MANUFACTURING THE SAME

RELATION TO COPENDING PATENT APPLICATIONS

This patent application is a continuation-in-part to U.S. patent application Ser. No. 08/744,279 filed on Nov. 6, 1996, now abandoned, that was a continuation-in-part of U.S. patent application Ser. No. 08/593,881 filed on Jan. 30, 1996, now abandoned, that claimed priority of Korean Patent Application Number 95-40107 filed on Nov. 7, 1995.

FIELD OF THE INVENTION

This invention relates to a phosphor material for color CRTs, more specifically, to a phosphor material for color CRTs which increases luminous efficiency of a phosphor layer for the color CRT and decreases a current value according to an electron beam in a luminance of the same phosphor layer to increase resolution according to an electron beam spot reduction, by the introduction of a dry process which does not use water but uses a water-soluble material with excellent luminous efficiency in the process of braun tube screen.

BACKGROUND OF THE INVENTION

A phosphor layer of a cathode ray tube (CRT) is where energy of electron beams is charged to photoenergy. As shown in FIG. 1, electrons become luminous by collision with phosphor materials of a phosphor film layer 8 formed on a panel 11 on an opposite side of an observer. The properties of the phosphor layer depend greatly on the properties of the phosphor material that are used.

In general, phosphor materials used in forming the phosphor layer for color picture tubes (CPT) are produced by adding a small amount of impurities that act as an activator to a base body such as zinc sulfides or yttrium oxides, etc., and then allowing the impurities and base body to calcinate for in the range of from about 30 minutes to one hour at a temperature of in the range of from about 700–300° C. Useful activator materials include copper (Cu), gold (Au), rare earth elements, etc.

A process for manufacturing a phosphor film layer for color picture tubes comprises the steps of: coating a photoresist to inside of a panel; exposing the coated panel to light; and developing, graphite coating, etching, and forming graphite stripes to form black matrixes (BM), by photolithography.

A step of forming a phosphor film is followed. A phosphor slurry composition is prepared by suspending phosphor materials in a solution of poly vinyl alcohol (PVA) and ammonium dichromate (ADC) through a slurry method. Referring to FIG. 2, the phosphor slurry composition 22 is coated onto an inside surface of the panel 11 and is circling around the panel through a nozzle 21. The panel is dried by an infrared heater and a shadow mask is deposited onto the coated panel surface to solidify a photosensitive layer thereon by exposing the photosensitive layer by exposure to UV light. The photosensitive layer is developed with water to form a phosphor material pattern.

An aluminum film is formed by coating the phosphor layer between black matrixes inside of the panel, filming to form an organic film, and depositing aluminum. Organic materials remained on the phosphor layer are removed by heat treatment.

As indicated above, a phosphor screen is formed by exposing photosensitive coating layer to UV light, which comprises phosphor materials, polyvinyl alcohol, ammonium dichromate, water and interfacial active agent, etc. However, substantially, photosensitivity mechanism is proceeded by polyvinyl alcohol, ammonium dichromate and water. A mechanism for formation of a phosphor layer is divided into a dark reaction and a light reaction.

A dark reaction means the oxidation-reduction reaction incurring between polyvinyl alcohol and ammonium dichromate in the phosphor material slurry. A light reaction means a reaction in which, after breakage of chains of polyvinyl alcohol, polyvinyl alcohol cross-links by $Cr^{+3}$ ions reduced from $Cr^{+6}$. Consequentially, in this reaction, solubility of polyvinyl alcohol for water is decreased.

Because water is used in the photoreaction, insufficient water on the coating layer inhibits the reaction, on the contrary, extra water inhibits three-dimensional crosslinking.

$Cr^{+3}$ which is produced in the photoreaction and acquired in this reaction again, is reacted with water by competitive reaction to form a stable compound. However, this compound does not attribute to cross-linking. The product can be obtained under the condition that pertinent moisture be maintained on the phosphor layer during the light reaction.

A picture is acquired by illuminating phosphor materials coated onto the interior surface of a panel 11, by energy provided by electron beams fired from an electron gun 14, as shown in FIG. 1. In above the process, the coating process comprises pouring phosphor materials of aqueous solution for coating, exposing to light after precipitating phosphor materials, hardening and washing, sequentially. In the case where the phosphor material is soluble in water, it has drawbacks of not being precipitated and facile to drive off at washing. The phosphor material must not react with water in order to preserve its characteristics. Accordingly, water-soluble phosphor materials have been excluded from consideration even if it has distinguished phosphor efficiency, color coordinates, time of afterglow, etc.

SUMMARY OF THE INVENTION

The object of the present invention is to elevate luminance and visibility of color picture tube, through dry filming process for the use of a water-soluble phosphor material which has been excluded from the conventional color picture tubes.

The present invention provides a water-soluble phosphor material for color picture tubes represented by the following formula and that is doped with a coating to control positive charges of 0.1 to 5 weight %:

$$M_xGa_yO_z:A_4$$

wherein M is an alkali metal, x=1 to 5, y=1 to 5, z=2 to 8, and wherein P is an activator. It is preferred that the coating material to control positive charges be selected from the group consisting of ethyl cellulose, polymethylmethacrylate (PMMA), nigrosine, and quaternary ammonium salt. Preferred alkali metals are selected from the group consisting of lithium, sodium, potassium, rubidium, and cesium. Preferred activators are selected from the group of conventional activators consisting of Fe, Cu, Al, Au, and rare-earth metals. Particularly preferred activators are Cu or Al. The water-soluble phosphor material has a spinel structure.

The present invention provides a process for preparing the water-soluble phosphor material for color picture tubes comprising the step of heating an alkali-metal galliumsulfate $(MGa(SO_4)nH_2O)$ material in the atmosphere. The process can further include the steps of mixing alkali-metal galliumoxide $(MGaO_2(1))$ and a gallium dispersed liquid, evaporating the mixture solution of alkali-metal galliumoxide and the gallium dispersed liquid by dry distillation method, and coprecipitating the evaporated mixture solution. As used in this invention, the term "gallium dispersed liquid" is understood to refer to a liquid, such as water or alcohol, in which $Ga(SO_4)$ is soluted.

Also, the present invention provides a process comprising the steps of mixing galliumhydroxide $(Ga(OH)_3)$ in the state of a gel and alkali-metal hydroxide $(M(OH))$, and dehydrating quickly by dry distillation the mixture solution of galliumhydroxide and alkali-metal hydroxide at a temperature of from about 300 to 500° C.

This invention also provides a water-soluble phosphor fluidized powder for color picture tubes comprising a phosphor material and a fluid. The water-soluble phosphor material is represented by the following formula, and is doped with a coating material to control positive charges of 0.1 to 5 weight %:

$M_xGa_yO_z$:A wherein M is an alkali metal, and x=1 to 5, y=1-to 5, z=2 to 8, and wherein A is an activato
The coating material to control positive charges is preferably selected from the group consisting of ethyl cellulose, polymethylmethacrylate, nigrosine, and quaternary ammonium salt. The alkali metal is preferably selected from the group consisting of lithium, sodium. potassium rubidium and cesium. Preferred activators include those previously disclosed above. The water-soluble phosphor material preferably further comprises a dye or an activator. The fluid is air or nitrogen.

This invention provides a process preparing a phosphor layer for color picture tubes comprising the steps of charging a ,lass panel for a color picture tube established black matrix; exposing to light through mask to drive off the charges in the selective region on the glass panel; and dispersing positively-charged water-soluble phosphor fluidized powder to the exposed glass panel. The charging is produced by corona charging and the fluidized powder comprises a water-soluble phosphor material and a fluid.

The present invention provides a process for preparing a phosphor film for color picture tubes in which a water-soluble material is represented by the following formula, and is doped with a coating material to control positive charges of 0.1 to 5 weight %:

$M_xGa_yO_z$:A wherein M is an alkali metal, and x=1 to 5, y=1 to 5, z=2 to 8. and wherein A is an activator. The coating material used to control positive charges is preferably selected from the group consisting of ethyl cellulose, polymethylmethacrylate, nigrosine, and quaternary ammonium salt. The above alkali metal is preferably selected from the (group consisting of lithium, sodium. potassium, rubidium. and cesium. Preferred activator metals include those disclosed above. The water-soluble phosphor material further comprises a dye and has a spinel structure.

The process comprises the step of heating alkali-metal galliumsulfate $(MGa(SO_4) nH_2O)$ in the atmosphere, or the steps of mixing alkali-metal galliumoxide $(MGaO_2(1))$ and gallium dispersed liquid, evaporating the mixture solution of alkali-metal galliumoxide and the gallium dispersed liquid, and coprecipitating the evaporated mixture solution.

Additionally the process comprises the steps of mixing galliumhydroxide $(Ga(OH)_3)$ in the state of gel and alkali-metal hydroxide $(M(OH))$, and dehydrating quickly by dry distillation the mixture solution of galliumhydroxide and the alkali-metal hydroxide at a temperature of from about 300 to 500° C. The fluid is preferred to be air or nitrogen.

DETAILED DESCRIPTION

Phosphor materials of this invention are water soluble and are generally prepared by first preparing a host material, such as $M_xGa_yO_z$ and sintering an activator material A to the host material to form the compound $M_xGa_yO_z$:A. When electrons strike the phosphor material of this invention the host, $M_xGa_yO_z$, absorbs an energy from the electrons and transfers the energy to the activator, A, thereby causing the activator to be exited and radiate visible light. Phosphor materials of this invention can be coated onto a panel of a CRT by an electrophotographic screening method in which the phosphor material can be mixed with a fluid, such as air or nitrogen gas, before being charged positively and sprayed onto the panel to form a coating layer thereon.

The followings are presented as examples and are not intended to limit the scope of the invention.

EXAMPLE 1

Preparation of water-soluble phosphor material in lithium gallate system 100 grams (g) of $LiGa(SO_4)_2 nH_2O$ were heated in the atmosphere to produce a water-soluble compound $LiGaO_2$. An activator (A) was added to the compound and the compound and activator was sintered to produce a water-soluble phosphor material $LiGaO_2$:A. The activator selected was Cu to produce a green phosphor material. The water-soluble phosphor material $LiGaO_2$:A, was doped with ethyl cellulose of approximately 1 weight % to control positive charges. The water-soluble phosphor material prepared according to this example had a water solubility in the range of from about 0.75 to 0.95 grams/cc in water at approximately room temperature.

Preparation of a phosphor film for color picture tubes

Figure 4:
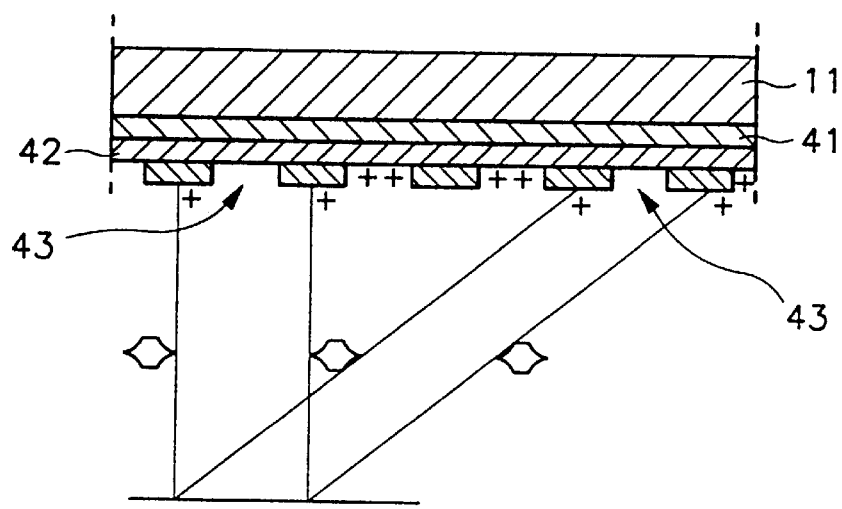
FIG. 4 is a schematic representation of an internal state after exposure to light of a glass panel for color picture tubes, which is positively charged.
Figure 6:
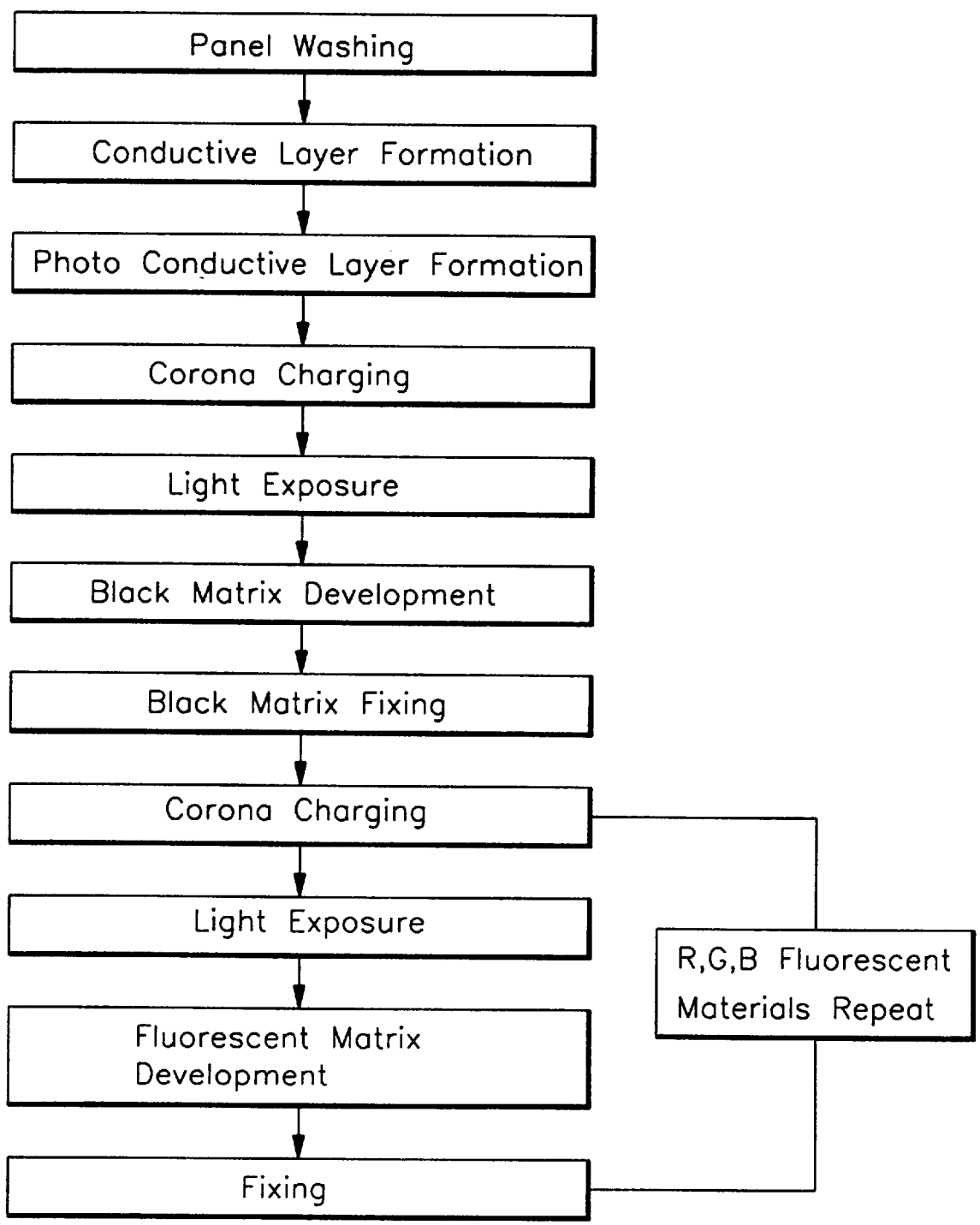
FIG. 6 is a protocol showing manufacturing process for a phosphor film of color picture tubes according to an example of the present invention.

The protocol for forming a phosphor film for color picture tube is set forth in FIG. 6, and final product is illustrated in FIG. 4. Layers of a conductive material 41 were constructed on a washed glass panel 11 for color picture tubes. A photoconductive material 42 was built on the conductive material layer 41 and was both corona-charged and exposed to light through shadow mask 43. Three exposures are required at this time from three different lamp positions to discharge the areas of photoconductor. Sequential development of black matrix by the method of electrophotography using liquid toner for black matrix was executed.

Figure 3:
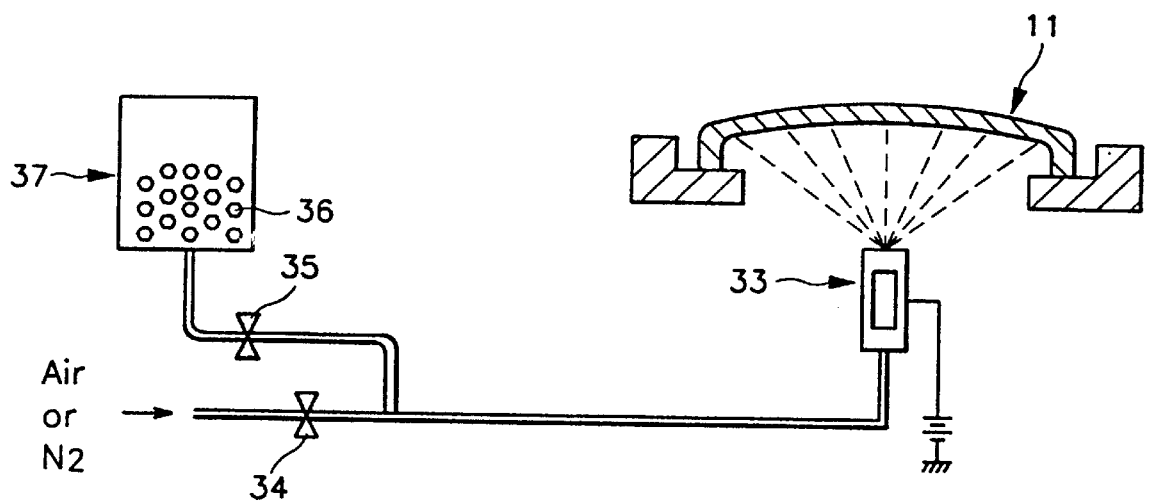
FIG. 3 is a schematic drawing showing the coating process for a water-soluble phosphor composition for color picture tubes according to the present invention.

Referring to FIG. 3, 50g of a powdered phosphor material 36, LiGaO$_2$:A prepared above. was sent to a feeder through an injector of a phosphor material powder tank 37. The powder 36 was transferred to an amount-controlling valve 35 of a phosphor material through a screw guided by revolution of a motor. By opening and shutting off the amount-controlling valve 35 of phosphor material, the concentration of a fluid supplied through the amount-controlling valve and the powdered phosphor material was adjusted to approximately 5 g/m$^3$. The water-soluble phosphor material in the form of powder was dispersed into a fluid composed of air or nitrogen, which fluid was controlled by fluid control valve 34, to form a fluidized powder. The fluidized phosphor mixture was supplied to a dispersion gun 33 and was charged positively, was charged positively, and the fluidized charged phosphor mixture 31 was diswnsedd onto tshe surface of the panel 11". Layers of the phosphor fluidized powder material formed on uncharged areas of an interior panel where a latent charge image was established. The above processes of corona charging, exposure development and fixing were carried out three times in the order of red, green and blue phosphor materials to obtain desired water-soluble phosphor layers for color picture tubes.

EXAMPLE 2

A process substantially the same as that set forth above in EXAMPLE 1 was carried out except that approximately 5 of Ga was added to a LiGaO$_2$ solution of 1 liter (L). The resulting solution was evaporated by dry distillation method at a temperature in the range of from about 300 to 500 ° C. to produce the compound LiGaO$_2$. An activator (A) was added to the compound, and the compound and activator was sintered to produce a water-soluble phosphor material LiGaO$_2$:A. The water-soluble phosphor material LiGaO$_2$:A was doped with ethyl cellulose of approximately 1 weight % to control positive charges.

EXAMPLE 3

A process substantially the same as that set forth above in EXAMPLE 1 was carried out except that Ga(OH)$_3$ in gel state was added to a Li(OH) solution, dehydrated quickly by dry distillation method at a temperature of approximately 400° C. to produce the compound LiGaO$_2$. An activator (A) was added to the compound, and the compound and activator was sintered to produce a water-soluble phosphor material LiGaO$_2$:A. The water-soluble phosphor material LiGaO$_2$:A was doped with ethyl cellulose of approximately 1 weight % to control positive charges.

Comparative Example 1

A process substantially the same as that set forth above in EXAMPLE 1 was carried out except that the water-soluble phosphor material LiGaO$_2$ was not doped with a coating material to control positive charges.

EXAMPLE 4

A process substantially the same as that set forth above in EXAMPLE 1 was carried out except that the water-soluble phosphor material LiGaO$_2$ was doped with polymethylmethacrylate to control positive charges.

EXAMPLE 5

A process substantially the same as that set forth above in EXAMPLE 1 was carried out except that the water-soluble phosphor material LiGaO$_2$ was doped with nigrosine to control positive charges.

EXAMPLE 6

A process substantially the same as that set forth above in EXAMPLE 1 was carried out except that the water-soluble phosphor material LiGaO$_2$ was doped with quaternary ammonium salt to control positive charges.

Comparative Example 2

Figure 1:
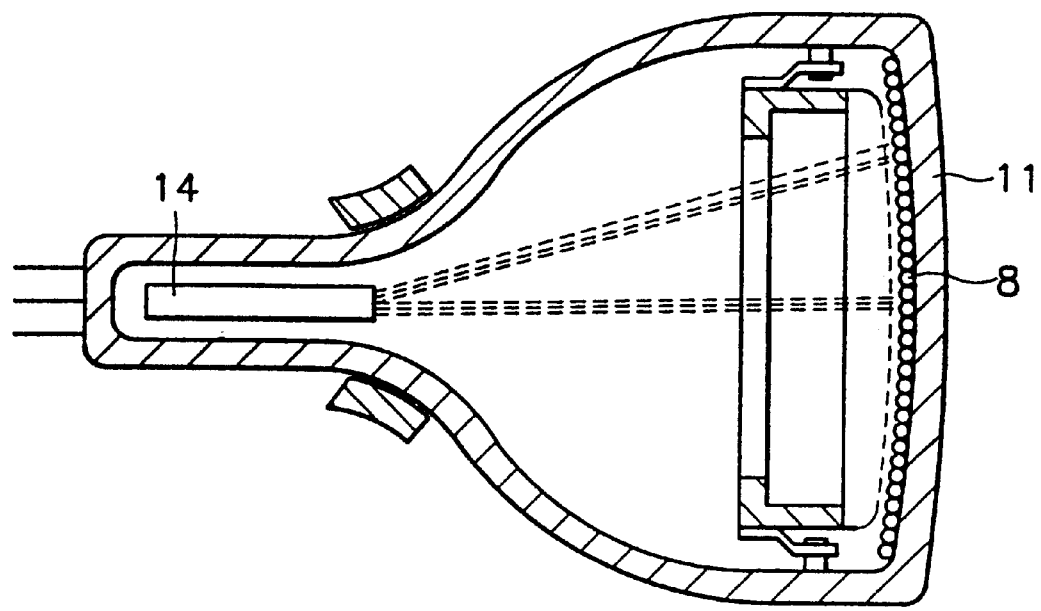
FIG. 1 is a schematic drawing of a color picture tube.
Figure 2:
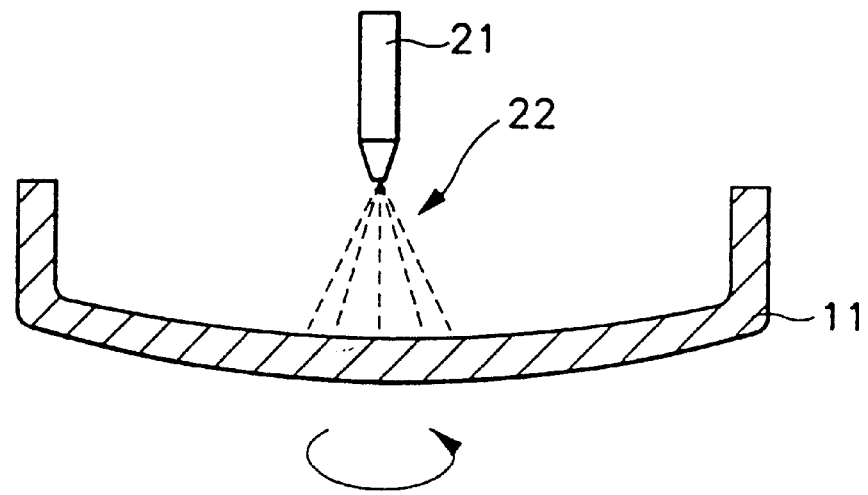
FIG. 2 is a schematic drawing of a coating process for a conventional water-soluble phosphor composition for color picture tubes.
Figure 5:
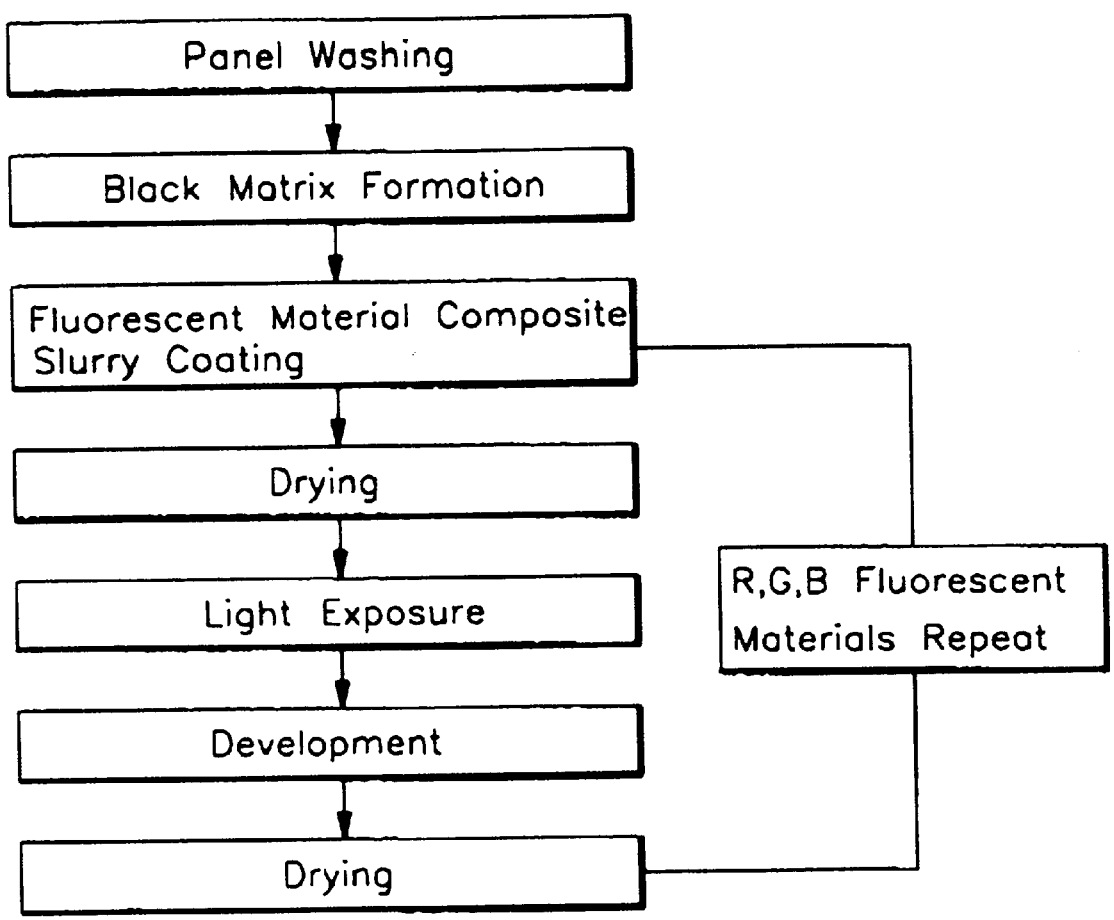
FIG. 5 is a protocol for a phosphor layer of color picture tubes according to a comparative example of the present invention.

Referring to FIG. 5, a washed glass panel for color picture tubes was dried, coated with a photoresist, dried, exposed to light, and washed to remove unreacted photoresist. Graphite was coated onto the panel., dried and washed with hydrogen peroxide to construct a black matrix. A phosphor slurry of ZnS CuAl was coated onto the panel on which black matrix in FIG. 2 was formed through a nozzle 21, and drying, exposure, and drying were carried out to prepare a phosphor layer.

The relative luminance of the phosphor layer in each of EXAMPLES 1 to 6 and COMPARATIVE EXAMPLES 1 and 2 was measured and is as follows:

| RELATIVE LUMINANCE | | |
|---|---|---|
| Example | Compound | Relative Luminance |
| Example 1 | LiGaO$_2$:A (ethyl cellulose) | 131 |
| Example 2 | LiGaO$_2$:A (ethyl cellulose) | 125 |
| Example 3 | LiGaO$_2$:A (ethyl cellulose) | 127 |
| Comparative Example 1 | LiGaO$_2$:A | 85 |
| Example 4 | LiGaO$_2$:A (PMMA) | 13 |
| Example 5 | LiGaO$_2$:A (nigrosine) | 125 |
| Example 6 | LiGaO$_2$:A (quaternary ammonium salt) | 125 |
| Comparative Example 2 | ZnSCuAl | 100 |

The luminance in 14" CDT (color display tube) at I$^k$=500 $\mu$A of EXAMPLE 3 and the COMPARATIVE EXAMPLE 2 was 88 Ft-L and 69 Ft-L, respectively. This test result illustrates that the phosphor material prepared according to the present invention had a higher luminance value than that of the conventional phosphor materials.

The relative luminance of the water-soluble phosphor layer prepared according to COMPARATIVE EXAMPLE 1 was lower than that of the COMPARATIVE EXAMPIE 2 because the phosphor layer of COMPARATIVE EXAMPLE 1 was not doped to prevent positive charges.

The present invention provides a phosphor layer with excellent luminance from water-soluble gallate phosphor material with notable luminance characteristics obtained by the process in FIG. 6 in which electrophotographic dry screening process for laser printers has been applied to the preparation of the color CRT screen.

The host compound prepared according to this invention is an alkali gallate phosphor material, of which empirical formula is M$_x$Ga$_y$O$_z$ (where M is Li, Na, K, Rb, or Cs). In general, Li$_5$GaO$_4$, LiGaO$_2$, LiGaO$_8$ and MGaO$_2$ (where M is an alkali metal) have been used.

The developing process according to this invention is carried out through positive-charging by corona charging on a glass panel with a black matrix for color picture tubes, and exposing the same to light.

A water-soluble phosphor fluidized powder is prepared as follows. First, a certain amount of phosphor material in the form of powder is put into an injector of a tank for powdered phosphor material, powdered phosphor material is sent to an amount-controlling valve of phosphor material through a screw guided by revolution of a motor. By opening and shutting off the amount-controlling valve of phosphor material, the phosphor material and a fluid supplied through the amount-controlling valve, for example air and nitrogen, are mixed to be proper ratio. After being mixed, the phosphor fluidized powder is supplied to a dispersion gun. The apparatus for triboelectrically or corona charging is mounted on it to obtain a positively-charged phosphor fluidized powder. Accordingly, a positively-charged phosphor fluidized powder is dispersed through an injector onto an interior panel, and a latent charge image is formed as indicated in FIG. 4 to be accumulated on uncharged areas by the repulsion of charges.

We claim:

1. A water soluble phosphor material for color picture tubes having the general formula $$M_xGa_yO_z:A$$

wherein M is an alkali metal, x=1 to 5, y=1 to 5, z=2 to 8, A is an activator, and wherein the phosphor material is doped with a coating material in the range of from about 0.1 to 5 percent by weight of the total material to control positive charges.

2. The water soluble phosphor material of claim 1 wherein said coating material is selected from the group consisting of ethyl cellulose, polymethylmethacrylate, nigrosine, and quaternary ammonium salt.

3. The water soluble phosphor material of claim 1 wherein said alkali metal is selected from the group consisting of lithium, sodium, potassium, rubidium, and cesium.

4. The water soluble phosphor material of claim 1 wherein said $M_xGa_yO_z$ has a spinel structure.

5. The water soluble phosphor material of claim 1 wherein the activator is Cu.

6. A process for preparation of a water soluble phosphor material for color picture tubes, the process comprising the steps of:

heating alkali-metal galliumsulfate in the atmosphere to produce a compound of formula $M_xGa_yO_z$ wherein M is an alkali metal, and x=1–5, y=1–5 and z=2–8;

adding an activator A to said compound of formula $M_xGa_yO_z$ ;

sintering said activator a and said compound of formula $M_xGa_yO_z$ to produce a phosphor material of formula $M_xGa_yO_z:A$; and coating said phosphor material of formula $M_xGa_yO_z:A$ with a coating material to control positive charges on said phosphor material.

7. A process for preparation of a water soluble phosphor material for color picture tubes, the process comprising the steps of:

mixing an alkali-metal galliumoxide and a liquid comprising a gallium-containing compound dispersed therein;

evaporating the mixture of alkali-metal galliumoxide and a liquid comprising a gallium-containing compound dispersed therein at 300–500° C. to produce a compound of formula $M_xGa_yO_z$, wherein M is an alkali metal, and x=1–5, y=1–5 and z=2–8;

adding an activator A to said compound of formula $M_xGa_yO_z$;

sintering said activator A and said compound of formula $M_xGa_yO_z$ to produce a phosphor material of formula $M_xGa_yO_z:A$; and coating said phosphor material of formula $M_xGa_yO_z:A$ with a coating material to control positive charges on said phosphor material.

8. A process for preparation of a water soluble phosphor material for color picture tubes, the process comprising the steps of:

mixing galliumhydroxide in the state of gel and an alkali metal hydroxide;

evaporating the mixture of galliumhydroxide and an alkali metal hydroxide at 300–500° C. to produce a compound of formula $M_xGa_yO_z$, wherein M is an alkali metal, and x=1–5, y=1–5 and z=2–8;

adding an activator A to said compound of formula $M_xGa_yO_z$;

sintering said activator A and said compound of formula $M_xGa_yO_z$ to produce a phosphor material of formula $M_xGa_yO_z:A$; and coating said phosphor material of formula $M_xGa_yO_z:A$ with a coating material to control positive charges on said phosphor material.

* * * * *

UNITED STATES PATENT AND TRADEMARK OFFICE
CERTIFICATE OF CORRECTION

PATENT NO.    : 5,968,415
DATED         : October 19, 1999
INVENTOR(S)   : Jongho Cho; Choonglak Kim It is certified that error appears in the above-identified patent and that said Letters Patent is hereby corrected as shown below:

Title page,
Item [73] the Assignee should read:

-- Samsung Display Devices Co., Ltd.,
      Kyungki-do, Rep. of Korea --

Signed and Sealed this

Twentieth Day of November, 2001

Attest:

NICHOLAS P. GODICI
*Attesting Officer*     *Acting Director of the United States Patent and Trademark Office*